United States Patent [19]

Willer et al.

[11] Patent Number: 5,368,662
[45] Date of Patent: Nov. 29, 1994

[54] TPE BINDER CONTAINING CRYSTALLINE MODIFIERS AND SOLID PROPELLANTS BASED THEREON

[75] Inventors: Rodney L. Willer; Robert S. Day, both of Newark, Del.; Alan P. Marchand, Denton, Tex.

[73] Assignee: Thiokol Corporation, Ogden, Utah

[21] Appl. No.: 954,361

[22] Filed: Sep. 29, 1992

[51] Int. Cl.$^5$ .............................................. C06B 45/10
[52] U.S. Cl. ................... 149/19.9; 149/19.1; 149/19.91; 523/180; 524/474
[58] Field of Search .................. 149/19.9, 19.91, 19.1; 523/180; 524/474

[56] References Cited

U.S. PATENT DOCUMENTS

| | | |
|---|---|---|
| 2,998,772 | 9/1961 | Land . |
| 3,682,727 | 8/1972 | Heinzelmann . |
| 3,986,906 | 10/1976 | Sayles . |
| 4,221,617 | 9/1980 | Rudy et al. . |
| 4,263,071 | 4/1981 | Bain et al. . |
| 4,289,551 | 9/1981 | Perrauet . |
| 4,392,895 | 7/1983 | Reed . |
| 4,412,875 | 11/1983 | Hasegawa . |
| 4,427,468 | 1/1984 | Duchesne et al. . |
| 4,536,236 | 8/1985 | Haas . |
| 4,941,931 | 7/1990 | Sayles . |

OTHER PUBLICATIONS

J. Org. Chem., 52:3455 (1987).
J. Org. Chem., 56:282 (1991).
J. Org. Chem., 55:3493 (1990).
J. Org. Chem., 54:5086 (1989).
T. G. Archibald et al, Synthesis and X-ray Crystal Structure of 1,3,3-Trinitroazetidine, *J. Org. Chem.* 55: 2920-24 (1990).

*Primary Examiner*—Edward A. Miller
*Attorney, Agent, or Firm*—Cushman, Darby & Cushman

[57] ABSTRACT

Improved thermoplastic elastomer compositions having improved processing and mechanical characteristics without requiring addition of excessive quantities of plasticizer comprise at least one thermoplastic elastomer loaded with a crystalline modifier having a relatively low melting point. The modifier can be liquid at the processing temperature, resulting in increased ease in handling of the product. An exemplary crystallizable modifier is an alkylated pentacycloundecane dimer.

22 Claims, No Drawings

TPE BINDER CONTAINING CRYSTALLINE MODIFIERS AND SOLID PROPELLANTS BASED THEREON

FIELD OF THE INVENTION

The present invention relates to thermoplastic elastomer-based compositions having at least one crystalline modifier having a melting point below the expected processing temperature of the composition, but well above the expected upper use temperature. More particularly, the present invention relates to improved binder compositions useful in energetic applications, including formulating propellants, explosives, gas generators, and pyrotechnics.

BACKGROUND OF THE INVENTION

In the production of explosives and propellants, one of the problems confronting manufacturers and users is the fact that the reactive portions of such compositions are not easily handled. For example, propellants or explosives are difficult to handle, pour, or cast due to their inherent physical and chemical properties, which can limit the usefulness of such propellants or explosives. For rocket propulsion, it is necessary to provide a propellant which can be easily placed within the rocket motor and which will stay in place until used. It is also desireable to have a mechanism to remove the propellant easily from the rocket motor prior to use.

In order to improve the physical and chemical characteristics of such compositions, it has become conventional to bind the reactive components within a composition which provides the overall the mixture with the necessary physical and chemical characteristics. One such composition has become known as a castable composite solid propellant. As the name implies, such a propellant can be cast into desired shapes, or can be cast into a particular operating environment, such as a rocket motor.

Typical castable solid propellant formulations include particulate and reactive solid materials. Such materials can, for example, include aluminum, ammonium perchlorate, and a burn rate catalyst, such as iron oxide, in the form of solid particulates, dispersed in a binder system. Typical castable solid propellant formulations include the particulate and reactive solid materials cured or bound into an elastic matrix or binder.

A variety of binder formulations are known for binding the particulate and solid reactive materials in an integral mass. One binder formulation comprises a polymeric composition which results in a propellant which is much more easily and safely handled than a simple mixture of the reactive solid materials themselves.

The mechanical properties of the binder formulation are critical. It is important to provide an end product which can be handled and satisfactory perform in the specific use environment. For example, a rocket motor must be easily loadable with propellant and be capable of operating in the environment encountered by the rocket motor, including operation under a variety of mechanical stresses and over a wide range of temperatures. A propellant also should be easily cleaned and de-loaded from the rocket motor if necessary, such as in demilitarizing certain rocket apparatus.

Thus, the nature of the binder can become extremely important depending upon the environments in which the resulting propellant must operate. For some propellants it may be necessary to operate under a wide range of conditions, from extreme cold to extreme heat. For other uses, temperature variation within a much more narrow range may occur. It is necessary for the final propellant formulation to have the necessary chemical properties and energy output, but also to maintain adequate mechanical properties over the range of expected operating conditions.

When a propellant or explosive is evaluated for its physical characteristics it is generally found that a propellant stress of about 100 psi is acceptable, and propellant strain in the 30 to 70% range is preferable. A binder matrix having these physical characteristics is generally acceptable for most applications.

Propellants can be cured by a chemical cross-linking reaction within a polymer binder. This process is known to provide binders, including thermosets, having the desired mechanical integrity. A common and relatively versatile chemically cured binder is obtained, for example, by the urethane reaction of a multi-functional hydroxyl terminated pre-polymer with a multi-functional isocyanate.

One of the significant disadvantages of chemically cured binder formulations, however, is that they are difficult to process and handle, although the necessary binding effect on the solid particulate reactive materials is obtained. Such chemically curable binders typically have a limited pot life, and thus must be cast into the casing, such as a projectile or rocket motor, within a short time after preparation. Otherwise, a chemically cured or chemically curing binder results, and once curing commences casting is no longer a viable option. Chemically cured binders often cure prematurely, i.e. prior to being cast, and thus an entire propellant batch can be lost due to premature curing.

An additional distinct disadvantage is associated with the essentially permanent chemical cross-linking characteristic of chemically cured binder formulations. Once the propellant is loaded in a rocket motor and cures to a chemically cross-linked product, it is very difficult to clean out the propellant. This is a distinct disadvantage when it becomes necessary to re-load a propellant, replace a propellant, remove the propellant for further processing, or demilitarize a rocket apparatus.

Propellants based on chemically cured binder formulations suffer from further disadvantages. For instance, poor interfacial mechanical properties between batches can arise, which creates difficulty in knitting one propellant batch to a previous one in a multiple-batch rocket motor even if critical propellant properties are verified prior to loading the rocket motor.

Thus, it would be advantageous to provide a binder and resulting propellant which did not rely on chemical crosslinking, yet had many of the desirable mechanical characteristics of chemically crosslinked binder formulations. Under ideal conditions, it would be desirable to provide a propellant which could be processed at elevated temperature and which solidifies and coalesces through physical, not chemical mechanisms, i.e. a propellant based on a thermoplastic elastomer binder formulation. In order to cast, recast, or remove such a propellant from a rocket motor, it would only be necessary to heat the propellant until it becomes flowable.

Formulation of certain propellants of this latter type have been attempted. One recent effort to provide a binder having acceptable processing and mechanical properties has been to use a hybrid thermoplastic elastomer (sometimes referred to as "TPE"). The thermoplastic portion of the polymer generally takes the form of a "brittle" polymer, such as polystyrene, whereas the elastomeric portion is based on an elastomeric polymer such as polybutadiene. One such polystyrene polybutadiene TPE is manufactured by Shell Chemical under the trademark Kraton® which is structurally an "ABA" type block copolymer, i.e., an end block of polystyrene, a mid-block of polybutadiene, and another end block of polystyrene.

A binder based on the above-mentioned ABA block copolymer formulation exhibits the thermoplastic properties of characteristics of polystyrene and the elastomeric properties of polybutadiene. Thermoprocessing is therefore possible with such a material, i.e. it is possible to simply heat the material in order to make it more workable. When heated, the various blocks pool together to form a flowable and processable material. This occurs because the polystyrene is not soluble in the polybutadiene, and vice versa.

This type of block copolymer can be used in a number of commercial applications. For example, it is widely used in athletic shoes where high processing temperatures are acceptable. This type of block copolymer has also been used to coat wires, and in a number of other similar commercial applications.

One obvious drawback for energetic applications, explosives and propellants is the need to process the binder and other propellant ingredients at high temperature. The use of high temperatures to process a composition which includes materials capable of releasing explosive energies poses hazards and should be avoided. Accordingly, the acceptable processing temperature for formulation and casting of a propellant or explosive is generally much lower than the acceptable temperature for manufacturing an athletic shoe or other consumer item.

In order to address the problems of processing thermoplastic elastomer-based binders at acceptable temperatures, it has generally been necessary to provide thermoplastic elastomer-based binder formulations having significant quantities of plasticizer, such as in excess of 60 wt. %. While the addition of some plasticizer is not a concern, the addition of sufficient plasticizer to render typical thermoplastic elastomers processable at acceptably low temperatures has presented problems. One of the primary problems has been the loss of mechanical integrity of the formulation. For instance, binder formulations of thermoplastic elastomers loaded with substantial amounts of plasticizers achieve acceptable processing characteristics, while sacrificing the desired mechanical integrity of the final product. This is an undesired trade-off in critical binder properties.

Accordingly, there has been a need for thermoplastic compositions which have the desirable mechanical and chemical properties of thermoplastic elastomers and which are also easily processable at acceptable temperatures.

More particularly, the art has sought, but so far failed to provide, suitable compositions which are reasonably processable without requiring addition of excessive quantities of plasticizers to attain acceptable processing characteristics and without sacrificing desired chemical and mechanical properties. It would thus be a significant advancement in the art, particularly in energetic applications, to provide compositions and methods for producing such compositions.

SUMMARY OF THE INVENTION

The present invention provides polymer-based compositions which retain the desirable chemical and mechanical properties of thermoplastic elastomers, but which are also easily processed. The present invention also provides polymer-based formulations which can have significantly reduced amounts of plasticizer added while still having acceptable processing characteristics, especially processing melt viscosity.

The present invention provides a polymeric composition, and methods for making same, which comprises a thermoplastic elastomer, and at least one crystalline modifier whereby both the mechanical and processing properties of the composition are improved.

The present invention further relates to compositions for use in formulating propellants and explosives having improved processing properties with, if desired, reduced amounts of plasticizer without degradation of the desired mechanical properties typically observed with known materials loaded with substantial amounts of plasticizer. The present invention provides a binder composition suitable for use in formulating a propellant or an explosive composition which comprises a thermoplastic elastomer and a crystalline modifier having a melting point below the processing temperature of the thermoplastic elastomer, but well above the expected upper use temperature.

The present invention solves the problem of processing thermoplastic elastomers and use of those materials for binders in explosives and propellants. The thermoplastic elastomer-based binders of the present invention are readily processed without requiring addition of excessive quantities of plasticizer and without the undesired degradation of mechanical properties characteristic of conventionally plasticized thermoplastic elastomer-based binders.

The thermoplastic elastomer-based binders of the present invention enable formulation of propellants or explosives exhibiting improved mechanical properties, such as improved stress and strain characteristics. This is a result which has heretofore been thought to be difficult or impossible to achieve.

While the present invention is particularly useful in the preparation of explosive and propellant binders, it has applicability in any setting where improved polymer processing characteristics without sacrificing mechanical properties is an important consideration.

DETAILED DESCRIPTION OF THE INVENTION

The present improved polymer compositions have enhanced processing characteristics without degrading the desired mechanical properties of the composition.

An exemplary polymer composition comprises (A) a thermoplastic elastomer; and (B) a crystalline modifier (hereinafter "crystalline modifier") having a melting point as high as, but preferably below, the temperature at which the thermoplastic elastomer is to be processed. The meltable crystalline modifier functions as a viscosity modifier when the polymer composition is being processed, and as a filler-like material when the composition is solid to provide enhanced structural integrity to the solid polymer composition. The polymer composition is readily obtained by adding a low melting crystalline modifier, which meets a series of selection criteria, to a thermoplastic elastomer.

Thermoplastic elastomers useful herein are polymeric hydrocarbon materials which can be processed thermally like a thermoplastic, by such techniques as extrusion, injecting molding, and blow molding but which in their operating temperature range have the physical properties of an elastomer (i.e. rubber). This property results from the replacement of the chemical crosslinking present in the three-dimensional network of a conventional chemically cured elastomer with physical crosslinking that dissociates at high temperatures but which can reform upon cooling. Exemplary useful copolymers include thermoplastic elastomers having A and B segments, wherein A represents a linear polymeric segment, which is hard at room temperature, such as polystyrene, and B represents a linear elastomeric soft segment. The two segments are preferably immiscible, and A is the minor component. In such preferred mode, the polymer is capable of forming a two phase structure where the two end segments form separate regions (domains) dispersed in the continuous elastomer phase. At room temperature, these domains are hard and join the elastomer chains into a three-dimensional network. Above the glass transition temperature ($T_g$) or melting point ($T_m$) of the hard segment polymer, the physical crosslinks are broken and the polymer will flow. When the polymer cools, the domains reform and the polymer regains its original elastomeric properties. Suitable such thermoplastic elastomers include styrenic thermoplastic elastomers in which the A segments are polystyrene and the B segments are, for instance, at least one polyalkylene, such as, for instance, polybutadiene, polyisoprene, or poly(ethylenebutylene), a commercially available such thermoplastic elastomer is known as Kraton ® (Shell Chemical Co.)

A suitable crystalline modifier appropriate for the polymeric material to be modified can be selected as follows.

The crystalline modifier should have a melting point within the range of temperatures achieved during normal processing of the polymeric material to be modified. In order to meet this criterion the crystalline modifier should melt and, preferably, exist as a liquid at normal processing temperatures of the polymeric material, and complement the processing characteristics of any additional ingredients, such a plasticizers, present in or added to the polymeric material. This provides a more fluid, i.e., pourable, composition during processing.

The crystalline modifier should have a sufficiently low vapor pressure at the expected processing temperature in order to minimize, if not avoid, evaporation or sublimation of the selected crystalline modifier while the polymeric composition is being processed or during post-processing storage of the modified composition. A crystalline modifier having insufficiently low vapor pressure will boil off or evaporate during processing or will sublime during storage.

It is preferred that the crystallization of the crystalline modifier interferes with neither the thermoplastic elastomer nor any other ingredient in the polymeric composition. In particular, the crystalline modifier should be capable of crystallizing and solidifying without interfering with the polymer matrix. For instance, with matrices composed of block copolymers, it is preferable that interference with either the hard or soft blocks of the block copolymer be avoided. Interference with the blocks of the copolymer can result in degraded mechanical properties of the polymer. Further, the meltable crystalline modifier is preferably capable of crystallizing to a solid, e.g. filler-like material, in order to maximize the mechanical properties of the modified polymer composition. Preferably, the meltable crystalline modifier forms a spherical crystal habit when solid in order to maximize mechanical properties in the final product.

During processing, it is preferred that the crystalline modifier complements other ingredients which can be present in the polymer formulation. For instance, if a plasticizer is present, the crystalline modifier should be insoluble in the plasticizer, but not interfere with the plasticizer during processing. The crystalline modifier is preferably capable of enhancing the properties of a plasticizer which can be present during the processing of the composition to be modified. Materials which interfere with the properties of a plasticizer would defeat the purpose of adding meltable crystalline modifier.

Typical processing temperatures for exemplary thermoplastic elastomer-based binders of the present invention are from about 100° C. to about 125° C. Accordingly for use in binders, a crystalline modifier typically has a melting point of less than about 125° C., and preferably has a melting point less than 100° C.

For use in propellant formulations, crystalline modifiers having a vapor pressure of less than about 1 mm (Hg) at 100° C. are preferred.

The crystalline modifier is preferably relatively dense, and has a high carbon:hydrogen ratio. Too low a ratio can upset the balance between thermoplastic and elastomeric properties desired in the polymeric component of the binder.

The amount of crystalline modifier present is not critical, although it is preferred that it be present in the polymer composition in an effective mechanical property enhancing amount. For instance, in a binder suitable for use in energetic applications, the modifier can be present in an amount from about 1% wt. to about 50% wt. of the binder, although about 10 % wt. to about 25 wt. % is preferred. In most binders and other thermoplastic elastomer formulations having plasticizers, the crystalline modifier can replace a selected amount of plasticizer without adversely affecting the processing viscosity of a binder while surprisingly providing enhanced stress and strain properties. In yet still other propellant and binder formulations having a conventional amount of plasticizer present, a meltable crystalline modifier can be added to enhance the mechanical properties, such as stress and strain.

An illustrative exemplary class of crystalline modifiers comprises alkylated dimers such as, for instance, alkylated pentacycloundecane dimers, and particularly mono-alkylated pentacycloundecane dimers. Lower-alkylated pentacycloundecane dimers are liquid within a desired processing temperature range, i.e., from about 95° C. to about 125° C., have relatively and sufficiently high densities and carbon:hydrogen ratios, and can serve as filler-like materials in thermoplastic elastomer based binders. Suitable alkylated dimers include monomethylated or monoethylated pentacycloundecane dimers.

Certain polycycloundecane ("PCU") compounds are known, *J. Org. Chem.* 39:1596 (1974). Mono-methylated pentacycloundecane compounds are known. Heptacyclo[6.6.0.0$^{2,6}$0.$^{3,13}$0$^{4,11}$0$^{5,9}$.0$^{10,14}$]tetradecane and pentacyclo[5.4.0.0$^{2,6}$.0$^{3,10}$.0$^{5,9}$]undecane are known, and it has been hypothesized that such compounds might be useful as a possible primary fuel for use in a certain art-defined class of missiles. See, e.g., Marchand, et al., Unusual Hydrocarbons: Novel Cage Hydrocarbons, Cage Dimers, and Polymers Derived From Polycyclic Hydrocarbon Monomers. A Potential New Class of Fuels for Airbreathing Missiles, 1988 JANNAF Ramjet Conference on Fuels for Future High Spread Vehicles (Conf. Nat. Acad. Sci. Study Center June 20-24, 1988) (reporting a hypothesized use as a possible ramjet fuel in air breathing missiles). Such compounds, however, are not satisfactory for use as conventional ramjet fuels, and dimers and oligomers thereof were proposed as ramjet fuels. Use of such compounds as a crystalline modifier to impart certain advantageous properties to thermoplastic elastomerbased binders and solid propellants based thereon has not been disclosed, and would not be a reasonably foreseeable application because binders and propellants present problems and considerations which are quite distinct from any possible hypothesized use in ramjet air breathing missile applications. PCU is highly volatile and thus not suitable for use as a crystalline modifier in a present binder or propellant application.

An alkylated pentacycloundecane dimer and mixtures thereof can be readily synthesized. For instance, suitable alkylated pentacycloundecane dimers, such as mono-$C_1$-$C_4$alkylated pentacycloundecane dimers, can be prepared from the corresponding alkylated pentacycloundecane-ones, such as mono-$C_1$-$C_4$ alkylated pentacycloundecane-ones. Alkylated pentacycloundecane-ones can be prepared by reducing a corresponding alkylated pentacycloundecane-dione monoalkylene ketal. An alkylated pentacycloundecanedione monoalkylene ketal can be prepared from alkylated pentacycloundecane-dione. An alkylated pentacycloundecane-dione can be prepared by photochemical cyclization of a Dieis-Alder reaction product of an alkylated cyclopentadiene and a suitable quinone. As used herein, $C_1$ to $C_4$ includes lower alkyls such as methyl, ethyl, propyl and butyl. Methyl is preferred.

An exemplary such procedure relative to an alkylated pentacycloundecane dimer, such as a monomethylated pentacycloundecane dimer, will now he described in greater detail.

An alkylated pentacycloundecane-dione starting material is prepared via a Dieis-Alder reaction conducted in a suitable solvent, such as an alcohol, for instance, methanol, followed by cyclization. For example, with respect to a precursor of a mono-methylated pentacycloundecane-dione starting material, a Dieis-Alder reaction yields endo-1-methyl and endo-9-methyltricyclo[6.2.1.0$^{2,7}$]undeca-4,9-3,6-diones, and is illustrated as follows:

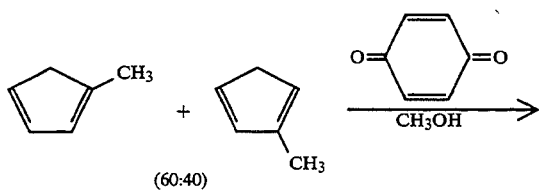

(60:40)

Starting materials for use in the Dieis-Alder reaction can be made in accordance with, or via simple modification of, the procedures described in *J. Org. Chem.* 25:518 (1960) and *Org, Synth.,. Coll* Vol. 4:238 (1963), the complete disclosures of which are incorporated herein by reference.

Dieis-Alder cycloadditions can be performed in accordance with simple modification of the procedure in *J. Org. Chem.* 39: 1596 ( 1974 ), which relates to an improved synthesis of a pentacyclo[5.4.0.0$^{2,6}$.0$^{3,10}$.0$^{5,9}$]undecane, the complete disclosure of which is incorporated herein by reference.

Photochemical cyclization of the thus prepared Dieis-Alder reaction products yields the mono-alkylated pentacycloundecane-dione. For instance, the photochemical cyclization can be achieved by irradiating a solution of the Diels-Alder reaction products with, for example, a mercury lamp having a Pyrex filter. A suitable solvent is ethyl acetate. The photochemical cyclization proceeds smoothly. For example, the photochemical cyclization of endo-1-methyl and endo-9-methyltricyclo [6.2.1.0$^{2,7}$]undeca-4,9-diene-3,6-diones to mono-methylated pentacycloundecane-diones is illustrated as follows:

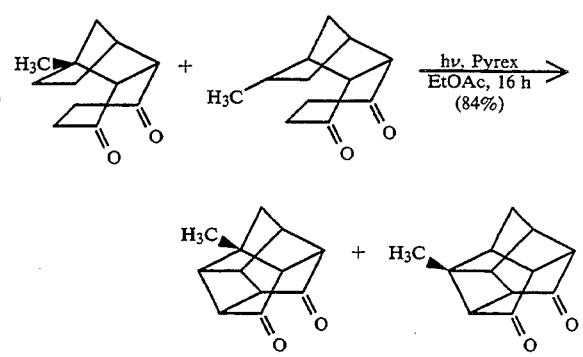

Photochemical cyclization reactions are known, and suitable procedures are described in *Chem. Ind.* 1003 (London 1958) and *J. Chem. Soc.* 3062 (1964) (photochemical cyclization of endo adducts to diketones), the complete disclosures of which are incorporated herein by reference.

The thus prepared mono-alkylated pentacycloundecane-dione starting material is reacted with a suitable glycol in the presence of a suitable catalyst to obtain a mono-alkylated pentacycloundecane-dione mono-alkylene ketal. Catalysts useful in preparing the ketal are known, and exemplary catalysts include para-toluenesulfonic acid monohydrate ("TsOH"), among others. Suitable alkylene glycols include ethylene glycol and propylene glycol, although ethylene glycol is preferred. For instance, preparation of mono-methylated pentacycloundecanedione mono-ethylene ketal by addition of ethylene glycol to mono-methylated pentacycloundecane-dione in the presence of a catalyst is illustrated as follows:

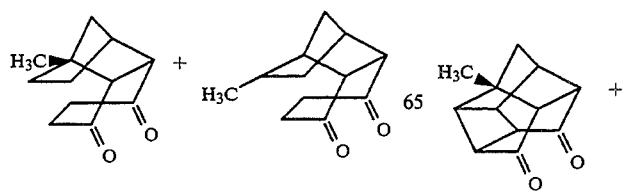

-continued

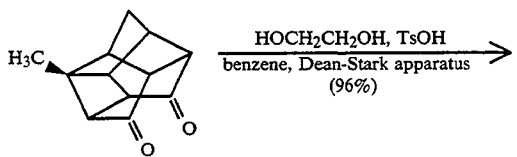

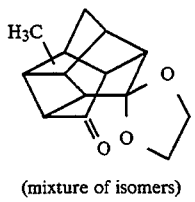

(mixture of isomers)

A thus obtained mono-alkylated pentacycloundecane-dione mono-alkylene ketal is reduced to a mono-alkylated pentacycloundecane-one. For instance, a solution of a mono-alkylated pentacycloundecane dione mono-alkylene ketal is reduced via a Wolff-Kirchner reduction to a mono-alkylated pentacycloundecane-one. Suitable solvents include diethylene glycol. For example, a Wolff-Kirchner reduction of a mono-methylated pentacycloundecane dione mono-ethylene ketal to a mono-methylated pentacycloundecane-one is illustrated as follows:

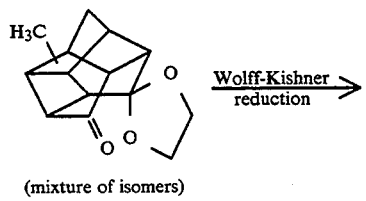

(mixture of isomers)

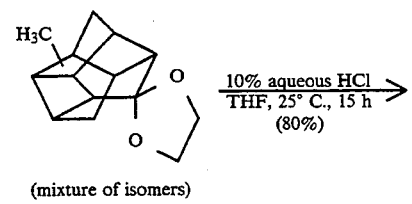

(mixture of isomers)

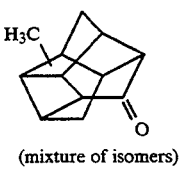

(mixture of isomers)

Wolff-Kirchner reduction of ketals is described in *J. Am. Chem. Soc.* 68:2487 (1946) and in *Am. Chem. Soc.* 71:3301 (1949), the complete disclosures of which are incorporated herein by reference.

A thus produced mono-alkylated pentacycloundecane-one can be converted to the desired mono-alkylated pentacycloundecane dimer via a Lenoir modified Mc-Murray olefin synthesis. A mixture of dimers can be produced. For instance, a methylated pentacycloundecane dimer can be obtained from a mono-methylated pentacycloundecane-one as follows:

A Lenoir modified McMurry olefin synthesis is described in *Synthesis* 553 (1977); *J. Am. Chem. Soc.* 96:4708 (1974) (titanium-promoted reductive dimerization); *J. E. Acc. Chem. Res.* 16:405 (1983); and *Synthesis* 883 (1989) (titanium-promoted reductive dimerization), the complete disclosures of which are incorporated herein by reference. If desired, a single dimer can be isolated from the reaction mixture via fractional recrystallization.

Other useful mono-alkylated pentacycloundecane dimers can be made according to the foregoing procedures. For instance, other useful lower-alkylated pentacycloundecane dimers can be prepared starting from a corresponding mono-alkylated pentacycloundecane-dione starting material. Thus, for example, a mono-ethylated pentacycloundecane dimer can be obtained starting from a mono-ethylated pentacycloundecane-dione, and a mono-propylated pentacycloundecane dimer can be obtained starting from a mono-propylated pentacycloundecane-dione.

Still other alkylated caged systems can be used as crystalline modifiers. For instance, mono-alkylated homocubylidenehomocubane, such as mono-methylated or mono-ethylated homocubylidenehomocubane, can be used. Also, homocubylidenehomocubane can be treated with Ag-NO$_3$-impregnated silica gel at 25° C. to induce homocubane-noranoutane rearrangement, and the mono-alkylated product of that rearrangement can also be used as a crystalline modifier.

The complete disclosure of *J. Org. Chem.* 56:282 (1991) is incorporated herein by reference.

Modifying a thermoplastic elastomer component by admixing therewith a crystalline modifier, such as, for instance, an alkylated pentacycloundecane dimer, proceeds facilely.

The term crystalline modifier includes a modifier in solid form or a modifier which is capable of crystallizing in the polymeric composition.

Unexpectedly, both the stress and strain characteristics exhibited by a gumstock, i.e. binder, according to the present invention are significantly improved, yet a desired critical processing characteristic, e.g., sufficiently low melt viscosity, is retained even though the amount of plasticizer can be reduced as compared to a conventional binder composition. Useful preferred ranges for stress and strain in a binder to be used in a castable rocket propellant preferably, respectively, are about 20 psi to about 100 psi, and about 300 to about 700%.

Polymeric compositions, particularly binder formulations suitable for use in a propellant or explosive applications, in accordance with the present invention are not restricted to binary systems comprising thermoplastic elastomer and crystalline modifier. For instance, a useful binder formulation comprises (a) a thermoplastic elastomer; (b) a plasticizer; (c) a crystalline modifier having a melting point below about 100° C. and a vapor pressure below about 1 mm Hg at 100° C.; and (d) hard block resin. More particularly, a useful binder composition can comprise (a) about 10 wt. % to 50 wt. % thermoplastic elastomer; (b) from about 40 wt. % to 70 wt. % plasticizer; (c) about 1 wt. % to 50 wt. % crystalline modifier; and (d) up to about 25 wt. % of at least one hard block resin. At higher the plasticizer levels, the amount of crystalline modifier present can be adjusted, as desired, to enhance desired mechanical properties in the final product. A further useful binder formulation comprises (a) about 10 wt. % to about 90 wt. % of a thermoplastic elastomer; (b) up to about 70 wt. % a plasticizer; (c) 10 wt. % to about 50 wt %; of a crystalline modifier have melting point below about 125° C., preferably below 100° C; and (d) up to about 25 wt. % of at least one hard block resin.

Suitable plasticizers are selected based on the thermoplastic elastomer selected. For instance, with thermoplastic elastomers having hard and soft blocks, the plasticizer is selected to retain separation between the hard and soft blocks (rubber phase) of the thermoplastic elastomer in the binder formulation. In such binder formulations, paraffinic based hydrocarbon plasticizers, such as, for instance, Shellflex ® 371 (Shell Chemical), which associate with the rubber phase of a thermoplastic elastomer (block copolymer) are preferred. If a plasticizer is present, the amount of plasticizer is generally less than about 70 wt. % of the binder, and preferably from about 40 wt. % to about 60 wt. % of the binder.

Hard block polymer resins are known as a class, and exemplary such hard block resins useful in the present invention are selected depending on the structure of the primary polymeric component of the composition, such as for example the thermoplastic elastomer, and the balance of properties desired in the final composition. Thus, a suitable hard block resin having a Tg greater than the overall Tg of a combination of, for instance, a thermoplastic elastomer and plasticizer can be added, if desired, in addition to the crystalline modifier, in a predetermined amount to raise that overall Tg as a further means for improving the mechanical properties of polymer compositions having large amounts of plasticizer. An exemplary useful hard block resin is poly(alpha)-methylstyrene, a commercially available example of which is Endex 160 (Shell Chemical), which has a Tg of 160° C.

Further, castable rocket propellants incorporating the present gumstocks exhibit significantly enhanced mechanical properties compared to like propellants incorporating a representative conventional gumstock. Useful castable propellants compositions comprises a binder according to the aforementioned embodiments, a metal fuel in an effective amount, a burn rate modifier, and inorganic energetic compound. An exemplary such propellant comprises about 10 wt % to about 15 wt. % of the binder, 0 to about 20 wt. % of the metal fuel, 0 wt % to about 2 wt. % burn rate modifier, 65 wt. % to about 85 wt. % inorganic energetic compound. Useful suitable metal fuels include, for instance, powdered aluminum, powdered magnesium, and powdered boron. Useful particle sizes for the metal fuel can range, for example, from about 1 micron to about 100 microns. Illustrative inorganic energetic materials include ammonium perchlorate and ammonium nitrate. The inorganic energetic material is added in fine particulate form with particle sizes ranging from about 5 microns to about 400 microns, and differing quantities of different sized particles can be selectively added. Burn rate modifiers include $Fe_2O_3$, ferrocene and others known to those skilled in the art. A specific example of such a propellant is 12 wt. % of binder, 19 wt. % of aluminum (MDX-85), 48.23 wt. % of ammonium perchlorate (mean particle size 200μ), 20.67 wt. % of ammonium perchlorate (mean particle size 18μ), and about 0.10 wt. % of a burn rate modifier such as $Fe_2O_3$.

EXAMPLES

The present invention is further illustrated by the following non-limiting examples.

Reference Example

Methylated pentacyclo[5.4.0.0$^{2,6}$.0$^{3,10}$.0$^{5,9}$]undecane dimers were prepared. "PCU" as used herein refers to the unmethylated compounds. Melting points are uncorrected.

A Diels-Alder cycloaddition of a mixture of 1- and 2-methylcyclopentadienes (prepared via thermal cracking of commercial "methylcyclopentadiene dimer" (Exxon)) to p-benzoquinone in methanol solution produced a mixture of endo-1-methyl and endo-9methyl-tricyclo[6.2.1.0$^{2,7}$] undeca-4,9-diene-3,6diones. A solution which contained a mixture of such diones (60 grams, 0.32 mol) in EtOAc (88 mL) was prepared and then irradiated with a 450 watt medium pressure Hg lamp (Pyrex filter) for 16 hours to obtain a reaction mixture. Following irradiation, the thus obtained reaction mixture was concentrated in vacuo, whereby a crude material comprising a mixture of 2-methyl- and 3-methyl-PCU-8, 11-diones (50.4 grams, 84%) was obtained To a solution of the thus obtained crude material (18.8 grams, 100 mmol) in benzene (100 mL) was added ethylene glycol (18.6 grams, excess) and para-toluene-sulfonic acid monohydrate ("TsOH", 0.6 gram, catalytic amount). The reaction flask was fitted with a Dean-Stark apparatus, and the reaction mixture was refluxed with stirring for 6 hours. During this time, water, which continuously distilled (azeotropically, with benzene) from the reaction mixture, was removed by draining the trap in the Dean-Stark tube periodically. The reaction mixture was cooled to ambient temperature and then washed sequentially with 10% aqueous $NaHCO_3$ solution ($2 \times 100$ mL) and water ($2 \times 100$ mL). The organic layer was dried ($Na_2SO_4$) and filtered, and the filtrate was concentrated in vacuo. The residue was purified via column chromatography on neutral alumina (chloroform eluent), thereby obtained a mixture of methylated PCU-8, 11-dione monoethylene ketals as a viscous oil (22.3 grams, 96%).

Wolff-Kishner reduction of a mixture of the methylated PCU-8, 11-dione monoethylene ketals was performed. Sodium (69 grams, excess) was dissolved slowly in diethylene glycol (1000 mL). To the resulting solution was added 3 (69.6 grams, 300 mmol) and anhydrous hydrazine (96 mL, excess). The reaction vessel was fitted with a Dean-Stark apparatus, and the reaction mixture was heated with stirring at 150 ° C. Heating was continued for 6 hours, during which time, water distilled continuously from the reaction mixture was removed periodically by draining the trap in the Dean-Stark tube. Concomitant with the removal of water from the reaction mixture during the 6 hours heating period, the temperature of the reaction mixture was raised gradually from 150° C. to 220° C. Heating then was continued at 220° C. for an additional 9 hours. The reaction was cooled to room temperature, and water (2000 mL) was added. The resulting mixture was extracted with diethylether (4×300 ml), and the combined organic layers were washed with water (2×500 mL). The organic layer was dried (Na$_2$SO$_4$) and filtered, and the filtrate was concentrated in vacuo. The residue, which contained a mixture of the corresponding methylated PCU-8-one ethylene ketals, was dissolved in tetrahydrofuran ("THF") (300 mL). To this solution was added 10% aqueous HCl solution (500 mL), and the resulting mixture was stirred at room temperature for 15 hours. THF was removed in vacuo, and the aqueous residue was extracted with diethylether (4×200 mL). The combined ethereal extracts were dried (Na$_2$SO$_4$) and filtered, and the filtrate was concentrated in vacuo, thereby affording a mixture of methylated PCU-8-ones (5, 41.4 grams, 80%) as a colorless microcrystalline solid that melted over a wide range (mp 115°–125° C.).

Lenoir's modification of the McMurry olefin synthesis, proceeding via Ti-promoted reductive carbonyl coupling, was employed to prepare a mixture of methylated PCU dimers. Thus, TiCl$_4$ (14.2 grams, 75 mmol) was added to a flask which contained dry THF (250 mL) under argon, Zn dust (10.0 grams, 0.153 g-atom) was thereafter added portionwise with stirring, and the resulting mixture was refluxed under argon for 1 hour. The mixture was allowed to cool gradually to room temperature, at which time pyridine (5 mL) and a solution of methylated PCU-8-ones (12.18 grams, 70 mmol) in dry THF (20 mL) was added with stirring to produce a reaction mixture. The thus obtained reaction mixture was refluxed for 22 hours and then allowed to cool gradually to room temperature. The reaction was quenched by adding 10% aqueous K$_2$CO$_3$ solution (100 mL) to obtain a quenched reaction mixture. The resulting quenched mixture was filtered and the residue obtained was washed with CH$_2$Cl$_2$ (100 mL). The combined filtrates were extracted with CH$_2$Cl$_2$ (3×200 mL) and the organic layer thus obtained was washed sequentially with water (100 mL), 10% aqueous HCl solution (2×75 mL), and water (100 mL). The thus treated organic layer was dried and filtered, and the filtrate was concentrated in vacuo to obtain a residue. The residue was purified via column chromatography on silica gel (hexane eluent), thereby affording a mixture of methylated PCU dimers (8 grams, 73%) as a colorless microcrystalline solid that melted over a wide range (mp 95°–110° C.). Further elution of the chromatography column with CHCl$_3$ afforded a mixture of methylated PCU-endo-8-ols (2.3 grams, 19%) as a colorless microcrystalline solid: mp 120°–130° C.

Example 1

A gumstock according to an embodiment of the present invention was made by dissolving the ingredients in trichloroethane, pouring the thus obtained solution into a teflon coated pie pan, and allowing the trichloroethane to evaporate to obtain a flat sheet of gumstock. Thereafter, the dried gumstock, in sheet form, was cut into suitably sized specimens for testing, i.e., determination of selected physical properties.

The thus prepared gumstock according to the present invention comprised a thermoplastic elastomer (Kraton®D1102, 25.0 wt. %); plasticizer (Shellflex 371, 56.5 wt. %); hard block resin (Endex 160, 12.5 wt. %); and crystalline modifier (methylated pentacycloundecane dimer according to the reference example, 6.0 wt. %). Kraton® brand thermoplastic elastomer resins are from Shell Chemical. Shellflex ®371 brand plasticizers are from Shell Chemical. Endex® 160 brand hard block resin is a polyalphamethylstyrene resin, i.e., hard block resin, from Shell Chemical.

Comparative Example 1

A conventional gumstock having the formulation comprising Kraton D1102 (25 wt. %), Shellfex 371 (62.5 wt. %) and Endex 160 (12.5 wt. %) was prepared according to the method of Example 1, and was tested.

The gumstock of the present invention, Example 1, exhibited significantly improved mechanical properties compared to the conventional gumstock of Comparative Example 1. A sampling of the relevant mechanical characteristics is as follows:

TABLE I

| Property | Comparative Example 1 | Example 1 |
| --- | --- | --- |
| Melt viscosity at 260° F. | 82 | 84 |
| Stress (rupture), psi | 70 | 100 |
| Strain (rupture), psi | 500 | 600 |

Stress and strain were determined according to ASTM D-412. Melt viscosity was measured using a Haake Model RV-12 Rheometer.

Example 2

A propellant composition, as reported in TABLE II hereinbelow, according to the present invention was formulated based on the gumstock from Example 1.

TABLE II

| Gumstock (Example 1) | 12.00 wt. % |
| --- | --- |
| Al (MDX-85) | 19.00 wt. % |
| AP, 200μ | 48.23 wt. % |
| AP, 18μ | 20.67 wt. % |
| Fe$_2$O$_3$ | 0.10 wt. % |

In Example 2, and in the subsequent Comparative Example 2, "Al" refers to aluminum fuel and "AP" means ammonium perchlorate in the indicated particle size. Iron oxide acts as a burn rate modifier and modifiers of this type are often used in propellants and explosives. With regard to the stress and strain measurements, the first number indicates maximum stress or strain, while the second number relates to stress or strain at rupture.

Comparative Example 2

A propellant composition based on the conventional gumstock according to comparative example 1 was prepared and had the following composition:

TABLE III

| (wt. %) Percentage of total composition | Comparative Example 2 |
| --- | --- |
| Gumstock | 12.00 |
| Al (MDX-85) | 19.00 |
| AP, 200μ | 48.23 |
| AP, 18μ | 20.67 |
| Fe$_2$O$_3$ | 0.10 |

The propellant according to the present invention, Example 2, had significantly improved mechanical properties compared to the conventional propellant according to Comparative Example 2. Unexpectedly, both the strain and stress increased without substantial increase in the EOM ("end of mix") viscosity with the propellant composition according to the present invention. The mechanical properties of the propellants prepared in Example 2 and in Comparative Example 2 were determined, and are reported as follows:

TABLE IV

| Physical and chemical properties | Comparative Example 2 | Example 2 |
|---|---|---|
| EOM viscosity, kP (260° F.) | 22 | 28 |
| Stress (max, rupture), psi | 108/105 | 140/136 |
| Strain (max, rupture), % | 19/21 | 27/28 |
| Modulus, psi | 934 | 739 |

Strain and stress measurements were conducted in accordance with JANNAF procedures. Melt viscosity measurements were conducted as in Example 1. Unless otherwise indicated, the measurements determined at room temperature (about 77° F.).

Thus, it was found that a formulation within the scope of the present invention provided an improved propellant composition. When a binder according to the present invention is used in the formulation of a propellant, the desired mechanical properties of the propellant were improved, i.e., both stress and strain are increased in the final propellant.

The invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A binder suitable for use in a propellant or explosive composition comprising:
   at least one thermoplastic elastomer which is a block copolymer have a styrenic A segment and a B segment which is polyalkylene selected from the group consisting of polybutadiene, polyisoprene, and poly(ethylene-butylene); and
   at least one crystalline modifier selected from the group consisting of mono-ethylated pentacycloundecane dimer and mono-methylated pentacycloundecane dimer.

2. A binder composition suitable for use in a propellant or explosive composition comprising:
   at least one thermoplastic elastomer which is a block copolymer having hard blocks and soft blocks; and
   at least one mono-alkylated pentacycloundecane dimer, having a melting point at or below the processing temperature of the thermoplastic elastomer.

3. A binder composition suitable for use in a propellant or explosive composition according to claim 2 wherein the at least one dimer is present in an amount of 1 wt. % to 50 wt % of the total binder composition.

4. A binder composition suitable for use in a propellant or explosive composition according to claim 2 wherein the at least one dimer is present in an amount from 10 wt. % to 25 wt. % of the total binder composition.

5. A binder composition suitable for use in a propellant or explosive composition according to claim 2, wherein the dimer is at least one mono-$C_1$-$C_4$-alkylated pentacycloundecane dimer.

6. A binder composition suitable for use in a propellant or explosive composition according to claim 2, wherein the thermoplastic elastomer is a polystyrene polybutadiene block copolymer.

7. A binder composition suitable for use in a propellant or explosive composition according to claim 2, wherein the at least one dimer has a vapor pressure below 1 mm at 100° C.

8. A binder composition according to claim 2, wherein the stress at rupture is about 20 psi to about 100 psi.

9. A binder composition according to claim 2, wherein the strain at rupture is about 300% to about 700%.

10. A binder suitable for use in a propellant or explosive composition according to claim 2 comprising:
    (a) from 10 wt. % to 50 wt. % of said thermoplastic elastomer;
    (b) from 40% to 70 wt. % of plasticizer;
    (c) 1 wt. % to 50 wt. % of the at least one dimer; and
    (d) up to 50 wt. % of at least one hard block resin.

11. A propellant composition comprising an energetic material in an effective amount; and a binder according to claim 2.

12. A propellant composition according to claim 11, wherein the propellant contains a metal fuel in an effective amount and a burn rate modifier.

13. A propellant composition according to claim 11 wherein the energetic material is ammonium perchlorate.

14. A binder suitable for use in a propellant or explosive composition comprising:
    at least one block copolymer thermoplastic elastomer having hard blocks and soft blocks; and
    at least one alkyl-substituted caged polycyclo hydrocarbon having a melting point at or below the processing temperature of the thermoplastic elastomer.

15. A binder composition according to claim 14 which further comprises at least one plasticizer.

16. A binder according to claim 14, wherein said thermoplastic elastomer is present in an amount of 10 wt. % to 90 wt. %;
    said binder composition contains a plasticizer in an amount of 40 wt. % to 70 wt. %;
    said alkyl-substituted caged polycyclic hydrocarbon is present in an amount of 10 wt. % to 50 wt %; and
    said binder composition contains (d) up to 25 % of at least one hard block resin.

17. A binder composition according to claim 16, wherein the thermoplastic elastomer is a polystyrene polybutadiene block copolymer.

18. A binder composition according to claim 16, wherein the at least one alkyl-substituted caged polycyclic hydrocarbon is at least one member selected from the group consisting of mono-ethylated pentacycloundecane dimer or mono-methylated pentacycloundecane dimer, mono-methylated homocubylidene homocubane and mono-ethylated homocubylidene.

19. A propellant composition comprising an energetic material in an effective amount; and a binder according to claim 14.

20. A propellant composition according to claim 19, wherein the propellant contains a metal fuel in an effective amount and a burn rate modifier.

21. A propellant composition according to claim 19, wherein the energetic material is ammonium perchlorate.

22. A propellant composition according to claim 19, wherein in the binder the at least one alkyl-substituted caged polycyclo hydrocarbon is a mono-alkylated pentacycloundecane dimer or mono-alkylated homocubylidene homocubane.

* * * * *